United States Patent [19]

Perrault et al.

[11] 4,032,096

[45] June 28, 1977

[54] CURVED BRACKET ADAPTER

[76] Inventors: Frederick Perrault, 2644 W. 225th St., Torrance, Calif. 90505; Raymond E. Perrault, 2404 Colt Road, Rancho Palos Verdes, Calif. 90274

[22] Filed: Mar. 3, 1976

[21] Appl. No.: 663,629

[52] U.S. Cl. ............................... 248/73; 248/74 B; 248/70; 248/224.4
[51] Int. Cl.² ......................................... F16L 3/08
[58] Field of Search ............... 248/73, 74 B, 70, 49, 248/74 DB, 74 A, 62, 63, 65, 223, 224, 225, 301, 217

[56] References Cited

UNITED STATES PATENTS

| 2,050,510 | 8/1936 | Thomas et al. ...................... 248/70 |
| 2,375,513 | 5/1945 | Bach .................................... 248/62 |
| 2,907,198 | 10/1959 | Nunamaker et al. ................. 248/65 |
| 3,802,654 | 4/1974 | Jenko et al. .......................... 248/73 |
| 3,923,277 | 12/1975 | Perrault et al. ...................... 248/70 |
| 3,936,001 | 2/1976 | Clendaniel ........................... 248/65 |

FOREIGN PATENTS OR APPLICATIONS

| 1,364,240 | 5/1964 | France .................................. 248/65 |
| 1,192,700 | 5/1970 | United Kingdom .................. 248/70 |

*Primary Examiner*—Robert A. Hafer
*Attorney, Agent, or Firm*—Gausewitz, Carr & Rothenberg

[57] ABSTRACT

This invention provides an adapter for a bracket having a flat support surface with slots in it, the adapter comprising a unitary member having an arcuate surface positioned on the flat surface of the bracket with side flanges complementarily receiving the side edges of the bracket and end flanges having outer portions received in slots of the bracket. The arcuate surface of the adapter is used in supporting the load imposed on the bracket.

19 Claims, 5 Drawing Figures

CURVED BRACKET ADAPTER

BACKGROUND OF THE INVENTION

1. Field of the Invention:

This invention relates to an adapter to provide a bracket with a curved surface to support a load. 2. Description of the Prior Art:

In electrical and communication systems it is customary to support cables on brackets which supports the cable at spaced locations throughout their lengths. Typically, the brackets are attached to a vertical support such as a downcomer and have outwardly extending flat upper surfaces upon which one or more cables are positioned. Straps may be used in securing the cables to the brackets. An improved bracket of this type is shown in our U.S. Pat. No. 3,923,277. Although this bracket is very satisfactory in most installations, there are some cables which have soft insulating layers that are not suitable to rest on the flat supporting surfaces of such brackets. There is too much indentation of the bracket into the periphery of the cable and the insulating layer may be damaged if it engages a sharp edge. In the past, often such cables have been supported on adapter devices used with brackets, these devices presenting arcuate upper surfaces with adequate area to provide an acceptable support. The adapters frequency are made of porcelain and in all events have been relatively expensive and difficult to install. Their attachment to the bracket may not be as secure as is desirable. Moreover, past devices have not been adapted for use with the improved bracket of the aforementioned patent and other brackets, thereby increasing inventory problems and not allowing some existing brackets to be used in the support for these cables.

SUMMARY OF THE INVENTION

The present invention provides an adapter suitable for use with the bracket of U.S. Pat. No. 3,923,277, or others having elongated supporting walls with spaced slots in them. Normally these slots are used in receiving support straps which wrap around the load resting on the bracket. The adapter of this invention includes a unitary member having an arcuate wall that is concave upwardly. Side flanges extend downwardly from the side edges of the arcuate wall and additional flanges from its ends. The device is associated with the bracket by extending the side edges of the adapter over the side edges of the bracket so that the upper adapter wall rests on the flat surface of the bracket. The end flanges of the adapter fit within two of the spaced slots of the brackets and present downwardly facing edges that stabilize the adapter on the bracket.

The result is an installation that is made in a few moments yet which is very secure. The arcuate upper surface of the adapter fully supports the cable irrespective of its covering, protecting it from damage and providing for considerable area contact. Also the adapter protects the cable, positioning it away from any possible sharp edges which could damage its covering.

Figure 1:
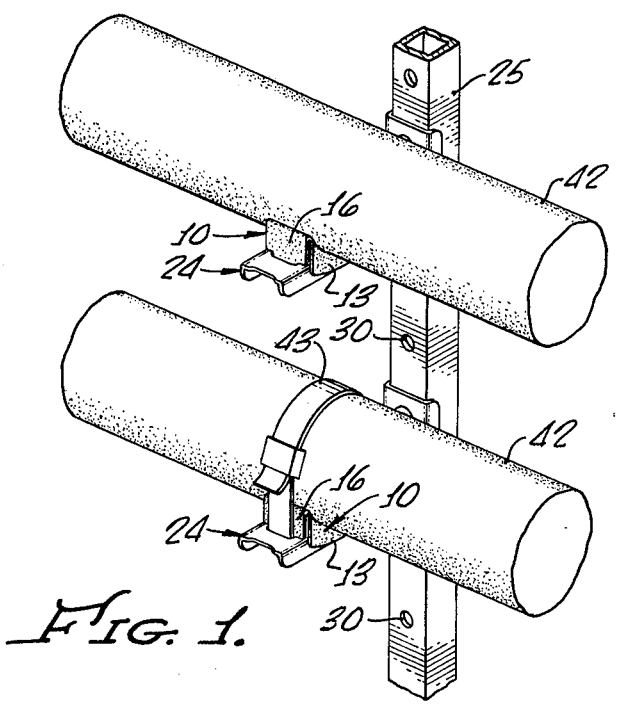
FIG. 1 is a perspective view showing the device of this invention as it is used.
Figure 5:
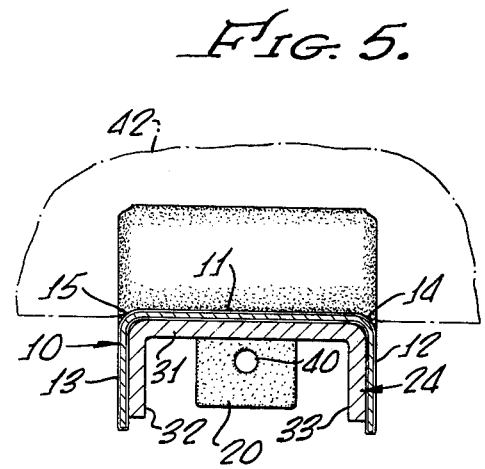
FIG. 5 is a transverse sectional view, taken along line 5—5 of FIG. 4.

DESCRIPTION OF THE PREFERRED EMBODIMENT:

The device 10 of this invention normally is made as a one-piece metal part which may be plastic coated. On the upper side of the device 10 is a relatively wide wall 11, which is a cylindrical segment that acts as the supporting surface when the device 10 is in use. Parallel side flanges 12 and 13 depend from the wall 11, extending outwardly at right angles from its convex side and connecting to it by rounded corners 14 and 15. These flanges extend substantially the full length of the wall 11 along its opposite side edges. At the ends of the wall 11 are additional flanges 16 and 17 which are parallel to each other and perpendicular to an imaginary line chordal with respect to the wall 11, extending between its ends.

The flange 16 includes a relatively wide portion 18 adjacent the end of the wall 11 along substantially its full width. The relatively wide flange portion 18 terminates in an outer edge 19 which is parallel to the axis of the arcuate wall 11. From the center of this edge projects a tab 20 which forms a narrower outer portion of the flange 16. The other end flange 17 is the same, having a relatively wide part 21 along the opposite end of the wall 11. Beyond the outer edge 22 of the wide part 21, which is parallel to the axis of the wall 11, is a central extension provided by a tab 23. The corners between the end flanges 16 and 17, and the arcuate wall 11 are rounded.

Figure 2:
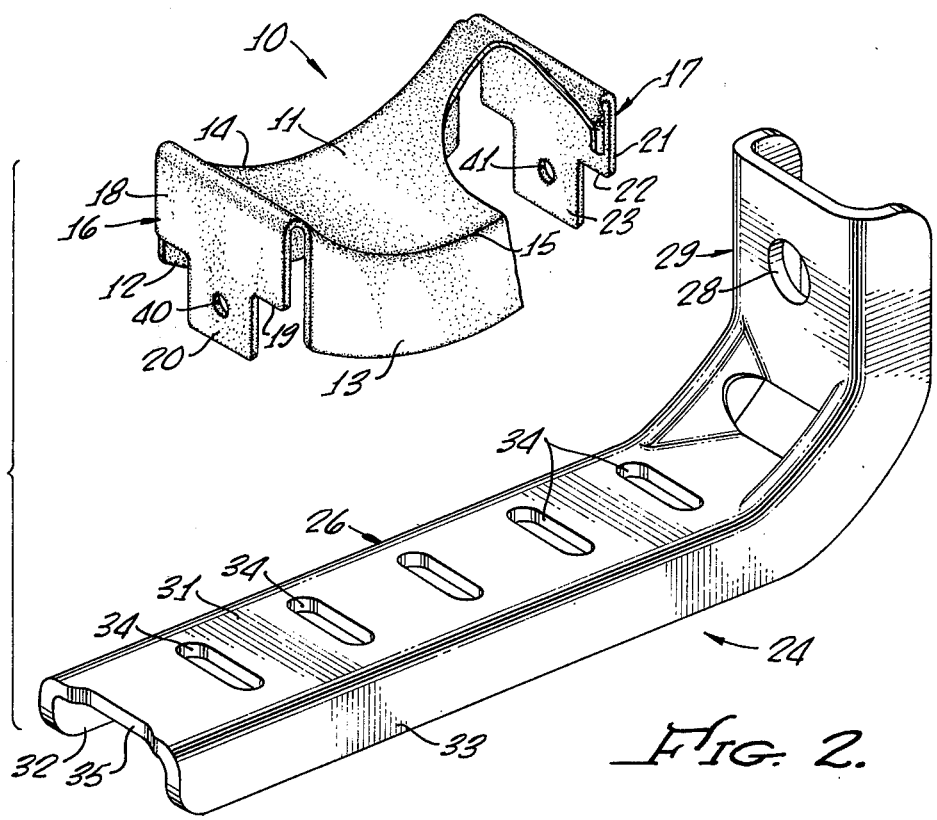
FIG. 2 is an enlarged exploded perspective view of the device of this invention and a bracket with which it is to be associated.

The adapter 10 of this invention is especially suitable for use with the bracket 24, shown in FIG. 2, which is the subject mater of U.S. Pat. No. 3,923,277. In this illustration, the bracket 24 is attached to a vertical square tube 25 with its horizontal portion 26 projecting outwardly at right angles from the tube. Attachment to the tube 25 is made by a bolt 27 that extends through an opening 28 in a relatively short vertical portion 29 of the bracket and through a pair of the series of aligned openings 30 in the opposite walls of the support tube.

The horizontal portion 26 of the bracket 24 includes an elongated flat upper wall 31 with flanges 32 and 33 extending downwardly at right angles from its side edges. Equally spaced in the wall 31 are transverse slots 34 which are parallel to each other and perpendicular to the side flanges 32 and 33. In conventional use of the bracket 24, the cables or other objects to be supported, rest on the upper wall 31 and are held to the bracket by straps running through the slots 34 or around the outer edge 35 of the bracket wall 31.

The adapter 10 is associated with the bracket 24 in the manner shown in FIGS. 2–5. The parts are proportioned so that the side flanges 12 and 13 of the adapter 10 overlap the side flanges 32 and 33 of the bracket 24. This preferably is a close fit so that the flanges 12 and 13 bear against the bracket flanges 32 and 33. The length of the adapter 10 is such that the tabs 20 and 23 of the end flanges 16 and 17 fit into two of the transverse slots 34 in the upper surface 31 of the bracket 24. Typically, the distance between the tabs 20 and 23 is such that they span the distance of four of the slots 34 in the bracket. In other words, with the tabs 20 and 23 in two of the slots 34, there are two additional slots 34 between the tabs. Any set of four slots 34 in a bracket may be selected for receiving the tabs of the adapter.

The adapter 10 is proportioned relative to the bracket such that the spacing between the end flanges 16 and 17 is approximately the same as the distance between the adjacent edges of the slots receiving them. This places the tab extension 20 of one end flange 16 next to the edge 36 of the slot receiving it, and spaced from the opposite slot edge 37. The extension 23 of the other end flange 17 is positioned alongside the edge 38 of the slot through which it extends, and spaced from the opposite slot edge 39. With the wall thickness of the adapter 10 being less than the slot dimension longitudinally of the bracket, this means that each of these slots has an open portion beyond the end flange of the adapter.

Although the tabs 20 and 27 are dimensioned to fit within the slots 34, the inner flange portions 18 and 21 are wider than the slots, being substantially the full width of the horizontal wall 31 of the bracket. Consequently, the lower edges 19 and 22 of the flange sections 20 and 23 are brought to position of adjacency with the upper wall 31 of the bracket 24 when the adapter is fitted on the bracket. In this position, the central part of the lower surface of the wall 11 of the adapter also is adjacent the wall 31 of the bracket.

When so installed on the bracket 24, ordinarily nothing further need be done to hold the adapter 10 to the bracket. When the side flanges 12 and 13 of the bracket are proportioned to fit closely over the side flanges 32 and 33 of the bracket, they provide a gripping force which frictionally holds the adapter to the bracket. Stability is provided by the engagement of the lower edges 19 and 22 of the end flange 20 and 23 with the wall 31 of the bracket, which prevents the adapter from rocking on the bracket. The tab ends 19 and 21 of the end flanges also retain the adapter 10 against movement laterally or longitudinally of the bracket wall 29. The major loads on the adapter are taken out through the central portion of the wall 11 and transmitted to the wall 31 of the bracket 22.

Figure 4:
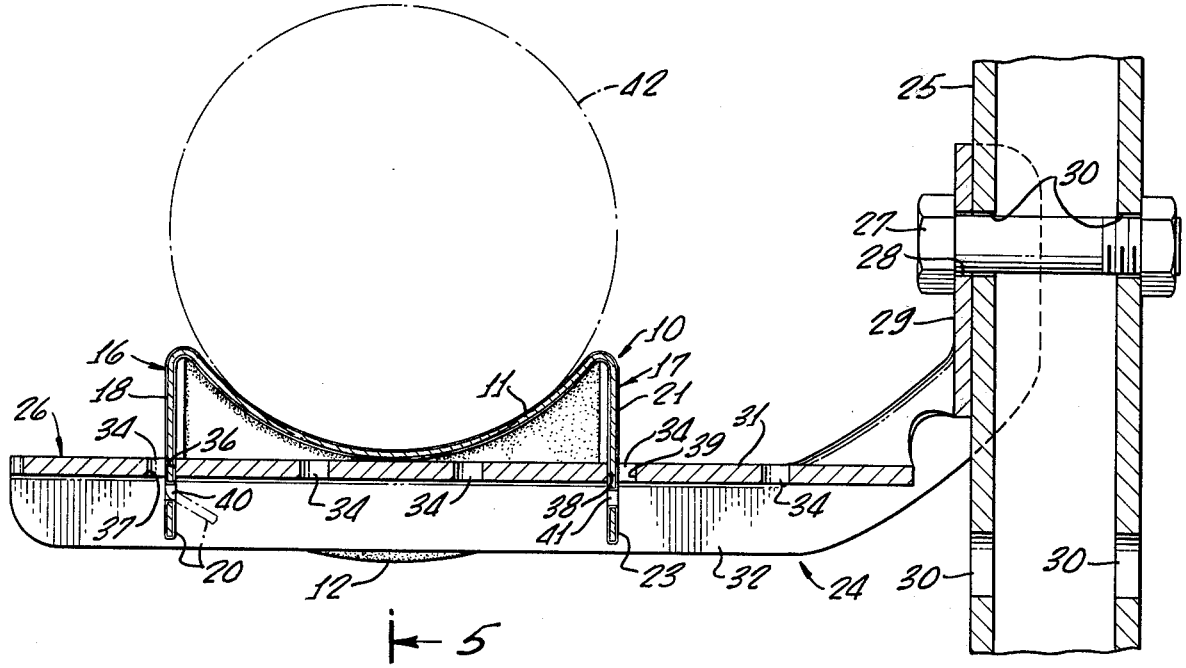
FIG. 4 is a longitudinal sectional view, taken along line 4—4 of FIG. 3.

If desired, one or both of the tab ends 20 and 23 of the end flanges may be bent beneath the wall 31 to provide further retention of the adapter 10 on the bracket 24, as shown in phantom in FIG. 4. Bending of the tab ends 20 and 23 is facilitated by the formation of openings 40 and 41 in these portions of the end flanges, positioned to be close to the undersurface of the wall 31 of the bracket when the adapter 10 is in place. These openings locally weaken the tabs 20 and 23 slightly so that they bend more readily. The openings 40 and 41 serve additional functions. They provide a means to hold the adapter 10 when it is to be dipped for a plastic coating. A wire or rod also may be extended through the openings 40 and 41 as an alternative way of retaining the adapter 10 on the bracket 24.

Figure 3:
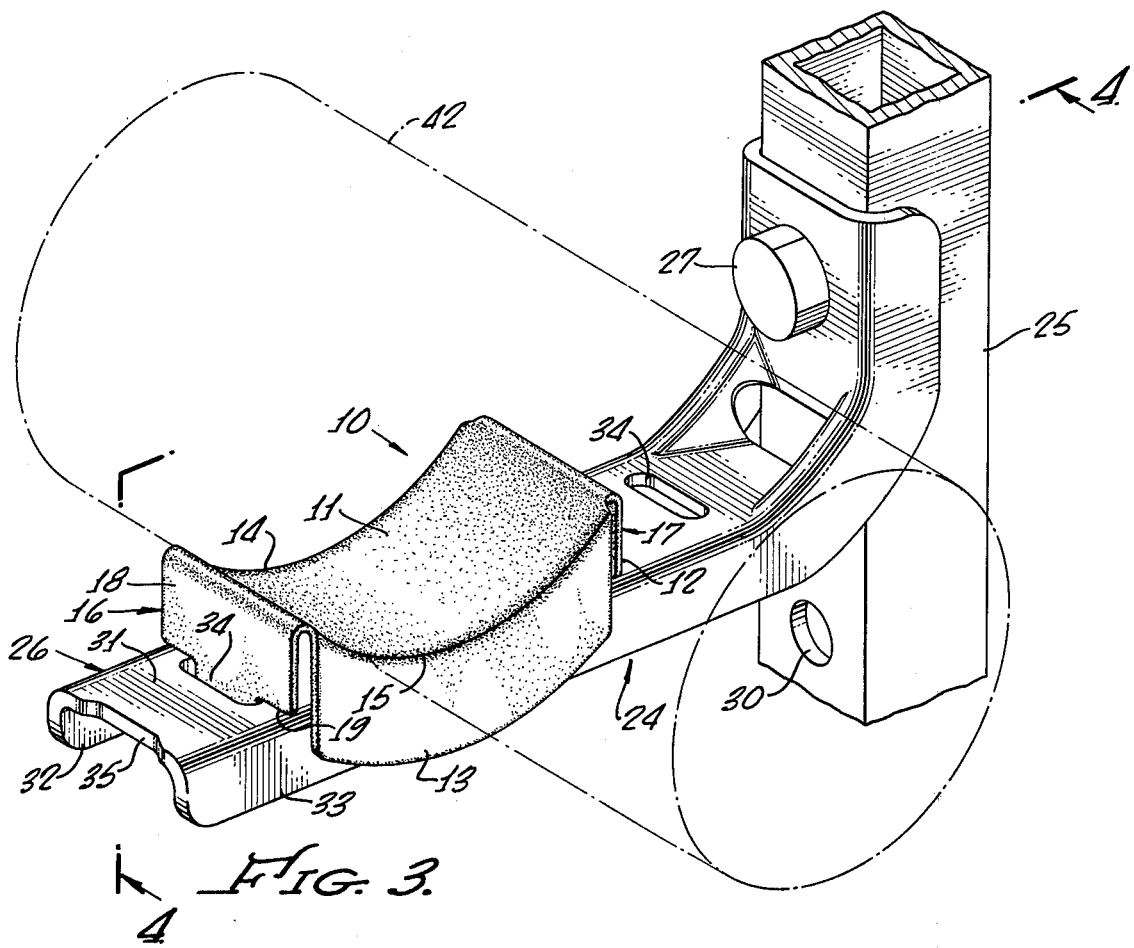
FIG. 3 is a perspective view of the device on the bracket.

When the adapter 10 is attached to the bracket 24, its upper wall 11 can support a load such as a cable 42, as shown in FIGS. 1, 3 and 4. The cable 42 may be of a size that has a radius up to that of the wall 11 of the adapter. The curved adapter surface, in any event, firmly supports and protects a soft and distortable insulation layer on a cable which it supports. Also, the adapter 10 keeps the cable 42 away from the head of the fastener 27 that secures the bracket 24 to the support 25. This protects the cable 42 by keeping it away from the sharp edges of the told head which might tear or cut the insulation.

Ordinarily for cables of this type they are adequately supported by merely resting on the adapter 10. It is possible, if desired, however to use strapping to hold the cable in place. The strap 43, seen in FIG. 1, may extend through the open portion of one or both of the slots 34 that receive the tabs 20 and 23, going around the cable or other object supported and beneath the bracket wall 31. Optionally, the strap may pass through a free slot beyond the adapter 10 or around the end 35 of the bracket 24.

The foregoing detailed description is to be clearly understood as given by way of illustration and example only, the spirit and scope of this invention being limited solely by the appended claims.

We claim:

1. An adapter for providing a curved supporting surface on a bracket comprising
   a member having
   an arcuate wall having side and end edges, a convex surface and a concave surface,
   a side flange adjacent either of said side edges and extending outwardly from said convex surface of said arcuate wall,
   and an end flange adjacent either of said end edges and extending outwardly from said convex surface of said arcuate wall,
   said end flanges having transverse edges intermediate said arcuate wall and the outer edges thereof.

2. A device as recited in claim 1 in which said end flanges include
   first relatively wide portions adjacent said arcuate wall,
   and second relatively narrow portions adjacent said outer edges thereof,
   said transverse edges being at the outer ends of said first relatively wide portions.

3. A device as recited in claim 2 in which said second relatively narrow portions extend from the central parts of said first relatively wide portions.

4. A device as recited in claim 3 in which said arcuate wall is defined by a cylindrical segment.

5. A device as recited in claim 4 in which said side flanges extend substantially the full length of said arcuate wall.

6. A device as recited in claim 5 in which said first relatively wide portions of said end flanges extend substantially the full width of the ends of said arcuate wall.

7. In combination with a bracket having an elongated wall having two side edges, said wall having a plurality of spaced transverse slots therein, an adapter for said bracket comprising
   a member having
   an arcuate wall over said elongated wall of said bracket,
   said arcuate wall having a convex side adjacent said elongated wall and a concave side facing outwardly away from said elongated wall,
   a side flange on either side of said arcuate wall,
   said side flanges overlapping said side edges of said elongated wall and complementarily receiving the same,
   and an end flange depending from either end of said arcuate wall, each of said end flanges having a portion received in one of said slots in said elongated wall.

8. A device as recited in claim 7 in which each of said end flanges includes a first relatively wide portion extending from adjacent said arcuate wall to an outer edge remote from said arcuate wall, and a second relatively narrow portion extending from said outer edge, said relatively narrow portions being so received in said slots, said outer edges being in juxtaposition with said elongated wall for preventing substantial rotation of said member relative to said bracket.

9. A device as recited in claim 8 in which at least portions of said end flanges are substantially parallel to each other.

10. A device as recited in claim 8 in which said end flanges have openings through said second relatively narrow portions adjacent the undersurface of said elongated wall.

11. A device as recited in claim 8 in which at least one of said second relatively narrow portions is bent to one side beneath said elongated wall for holding said member to said bracket.

12. A device as recited in claim 8 in which each of said end flanges has a wall thickness less than the dimension of the one of said slots receiving the same in a direction longitudinally of said elongated wall, and said end flanges are spaced apart a distance relative to the spacing of said slots receiving the same such that said end flanges are relatively closer to the edges of said slots adjacent each other than they are to the opposite edges of said slots, whereby said slots receiving said end flanges have open portions beyond said end flanges.

13. A device as recited in claim 12 including an addition strap means extending through at least one of said open portions and over said member for holding an object on said arcuate wall.

14. A device as recited in claim 8 in which said arcuate wall is defined by a segment of a cylinder.

15. A device as recited in claim 8 in which said convex side of said arcuate wall intermediate said end flanges is in juxtaposition with said elongated wall of said bracket for conducting loads from said arcuate wall to said elongated wall of said bracket.

16. A device as recited in claim 8 in which said side flanges are substantially parallel to each other.

17. A device as recited in claim 16 in which said bracket includes side flanges depending from said elongated wall, said side flanges of said adapter overlapping and engaging said side flanges of said bracket and frictionally gripping the same.

18. A device as recited in claim 8 in which said adapter is shorter than the length of said elongated wall of said bracket.

19. A device as recited in claim 18 in which said bracket includes a portion for attachment to a support at one end of said elongated wall, said member being spaced outwardly from said portion of said bracket for protecting an object carried by said member from engagement with an attaching means at said portion of said bracket.

* * * * *